United States Patent [19]

Early

[11] Patent Number: 4,549,635

[45] Date of Patent: Oct. 29, 1985

[54] PORTABLE FOLDING HUNTING STAND

[76] Inventor: Victor Early, P.O. Box 42, New Waverly, Tex. 77358

[21] Appl. No.: 712,427

[22] Filed: Mar. 18, 1985

[51] Int. Cl.[4] .................. A01M 31/02; A45F 3/26; A47C 9/10
[52] U.S. Cl. ..................................... 182/187; 108/152
[58] Field of Search ................. 182/187, 188; 108/152

[56] References Cited

U.S. PATENT DOCUMENTS

| | | | |
|---|---|---|---|
| 1,712,974 | 5/1929 | Venard | 182/187 |
| 2,991,842 | 7/1961 | Hardin | 182/187 |
| 3,392,802 | 7/1968 | Moore | 182/187 |
| 3,493,080 | 2/1970 | Ehlert | 182/187 |
| 3,513,940 | 5/1970 | Ussery | 182/187 |
| 3,871,482 | 3/1975 | Southard | 182/187 |
| 4,129,198 | 12/1978 | Hunter | 182/187 |
| 4,150,733 | 4/1979 | Plummer | 182/187 |
| 4,236,602 | 12/1980 | Leggett | 182/187 |
| 4,475,627 | 10/1984 | Eastridge | 182/187 |

*Primary Examiner*—Reinaldo P. Machado

*Attorney, Agent, or Firm*—Neal J. Mosely

[57] ABSTRACT

A portable foldable hunting stand comprises a rigid U-shaped tubular platform and a rigid elongated tubular seat support member foldably connected thereto. The seat support member has a plate at one end with a wide angle V-notch, for abutting the surface of a vertically extending object on which it is to be mounted, and a padded seat rotatably mounted at the other end. A spike is selectively extendable from the platform to engage the surface of the object. A link chain secured at one end of the plate is looped around the vertically extending member and has its other end releasably received in a slot in the plate to attach the erected stand in a substantially horizontal position. A rope looped around the vertically extending object and releasably secured to each platform leg prevents disengagement and increases stability of the stand in the erected position. The rope provides a shoulder sling for carrying the stand in the collapsed transporting position. A T-bolt secures the stand in the folded and erected positions.

11 Claims, 8 Drawing Figures

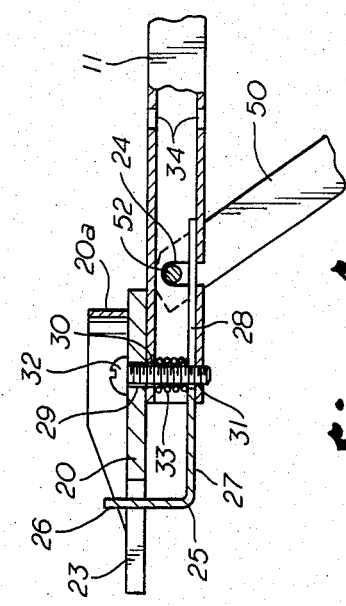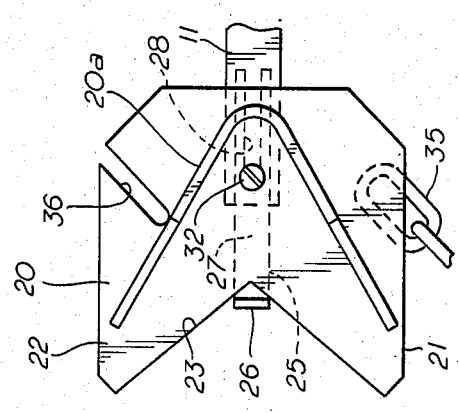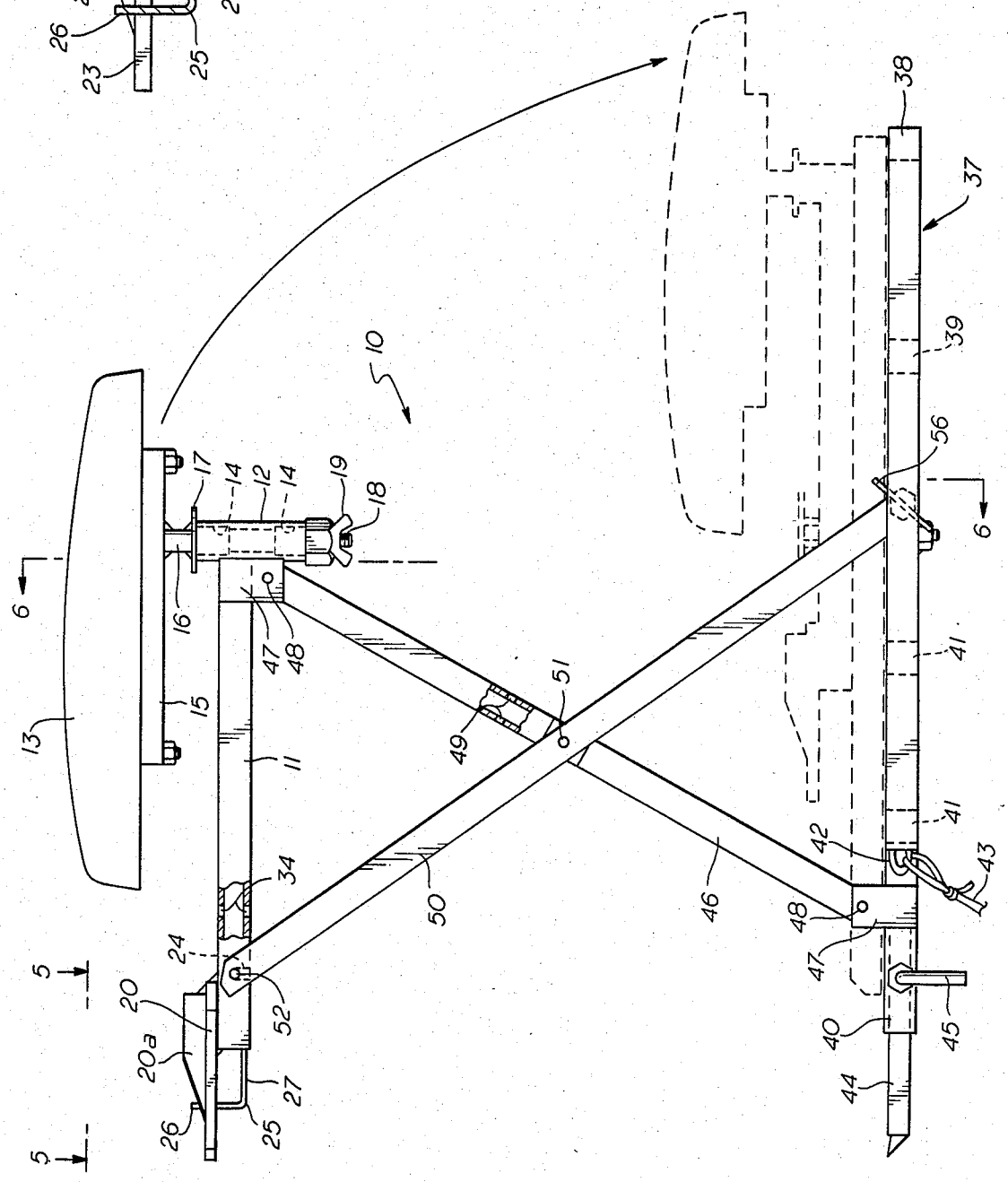

PORTABLE FOLDING HUNTING STAND

BACKGROUND OF THE INVENTION

1. Field of the Invention

This invention relates to hunting stands and platforms, and more particularly to a portable hunting stand foldable from a collapsed transporting position to an erected position for attachment to a vertically extending object.

2. Brief Description of the Prior Art

Folding hunting stands are known in the art. There are several patents which disclose folding hunting stands attachable to poles or trees.

Moore, U.S. Pat. No. 3,392,802 discloses a folding tree seat having a horizontal support arm with a seat at one end and a bight or forked portion at the other end engageable with a tree trunk. A pivotally connected prop assembly having foot rests extends downwardly from the support arm to also abut the tree trunk. A chain is looped around the tree trunk and selected links are received in slots in the support arm. The seat is not movable relative to the support arm, nor is it horizontally adjustable relative to the ground.

Ussery, U.S. Pat. No. 3,513,940 discloses a collapsible seat or platform with a support panel having a tree embracing notch at one end and a tree encircling chain for clamping the panel to a tree. The seat includes a pair of legs pivotally engaged with the forward portion of the panel for downward and rearward extension into engagement with the tree and a footrest extending from the lower portion of the legs. The seat is not movable relative to the support panel.

Southard, U.S. Pat. No. 3,871,482 discloses a lightweight, portable platform and seat assembly for carrying on a persons back. The device comprises a base including a rigid platform, a folding seat mounted upon the base, and a chain to encompass a tree and have the ends attached to the seat. The seat is a foldable type supported by legs collapsible into a generally flattened condition enabling the hunter to use the entire platform for standing room.

Leggett, U.S. Pat. No. 4,236,602 discloses a tree stand and seat pivotally connected to a vertical frame. The seat and stand pivot vertically for storage and carrying means are provided for adjusting the pitch of the seat. The pivoting of the stand is limited by cables which support most of the weight. Automobile seat belts and buckles attached to the frame permit attachment of the device to a tree. Carrying straps are attached to the bottom of the stand so that the device may be carried on ones back.

Venard, U.S. Pat. No. 1,712,974 discloses a contractor's equipment bracket having a top arm, an upright leg pivoted thereon, and support engaging toes on each of the parts. A chain wraps around the support and is connected to the top arm. The leg has upper and lower stirrups for supporting an applicable equipment part. The device has no seat.

The prior art in general, and these patents in particular, do not disclose the portable hunting stand foldable from a collapsed shoulder sling transporting position to an erected position for attachment to a vertically extending object and having the novel features described below.

SUMMARY OF THE INVENTION

It is therefore an object of the present invention to provide a new and improved portable folding hunting stand having a rotatable seat whereby the user may assume a variety of seated hunting positions away from the tree to allow increased arm movement and the seat may be rotated out of the way to allow the hunter to stand on the platform.

Another object of this invention is to provide a lightweight portable folding hunting stand which is easily transported in a compact collapsed shoulder sling position leaving the hands free for carrying guns or other hunting gear, and is quickly and easily erected to a rigid position for securely attaching to vertically extending objects such as poles or tree trunks.

Another object of this invention is to provide a portable folding hunting stand which has a primary upper securing means and a secondary lower securing means which are looped around the vertically extending object to prevent disengagement therefrom and increase stability of the stand.

A further object of this invention is to provide a portable folding hunting stand which is adjustable horizontally above the ground.

A still further object of this invention is to provide a lightweight portable folding hunting stand of simple construction which is economical to manufacture and rugged and durable in use.

Other objects of the invention will become apparent from time to time throughout the specification and claims as hereinafter related.

The above noted objects and other objects of the invention are accomplished by an improved portable hunting stand comprising a rigid U-shaped tubular platform and a rigid elongated tubular seat support member foldably connected thereto. The seat support member has a plate at one end with a wide angle V-notch, for abutting the surface of a vertically extending object on which it is to be mounted, and a padded seat rotatably mounted at the other end. A spike is selectively extendable from the platform to engage the surface of the object. A link chain secured at one end of the plate is looped around the vertically extending member and has its other end releasably received in a slot in the plate to attach the erected stand in a substantially horizontal position. A rope looped around the vertically extending object and releasably secured to each platform leg prevents disengagement and increases stability of the stand in the erected position. The rope provides a shoulder sling for carrying the stand in the collapsed transporting position. A T-bolt secures the stand in the folded and erected positions.

BRIEF DESCRIPTION OF THE DRAWINGS

FIG. 3 is a view in side elevation of the portable hunting stand of FIGS. 1 and 2 in the erected position.

FIG. 4 is a detail cross section of a portion of the portable hunting stand showing the lock pin.

FIG. 5 is a detail top plan view of a portion of the portable hunting stand showing the plate.

DESCRIPTION OF THE PREFERRED EMBODIMENT

Figure 1:
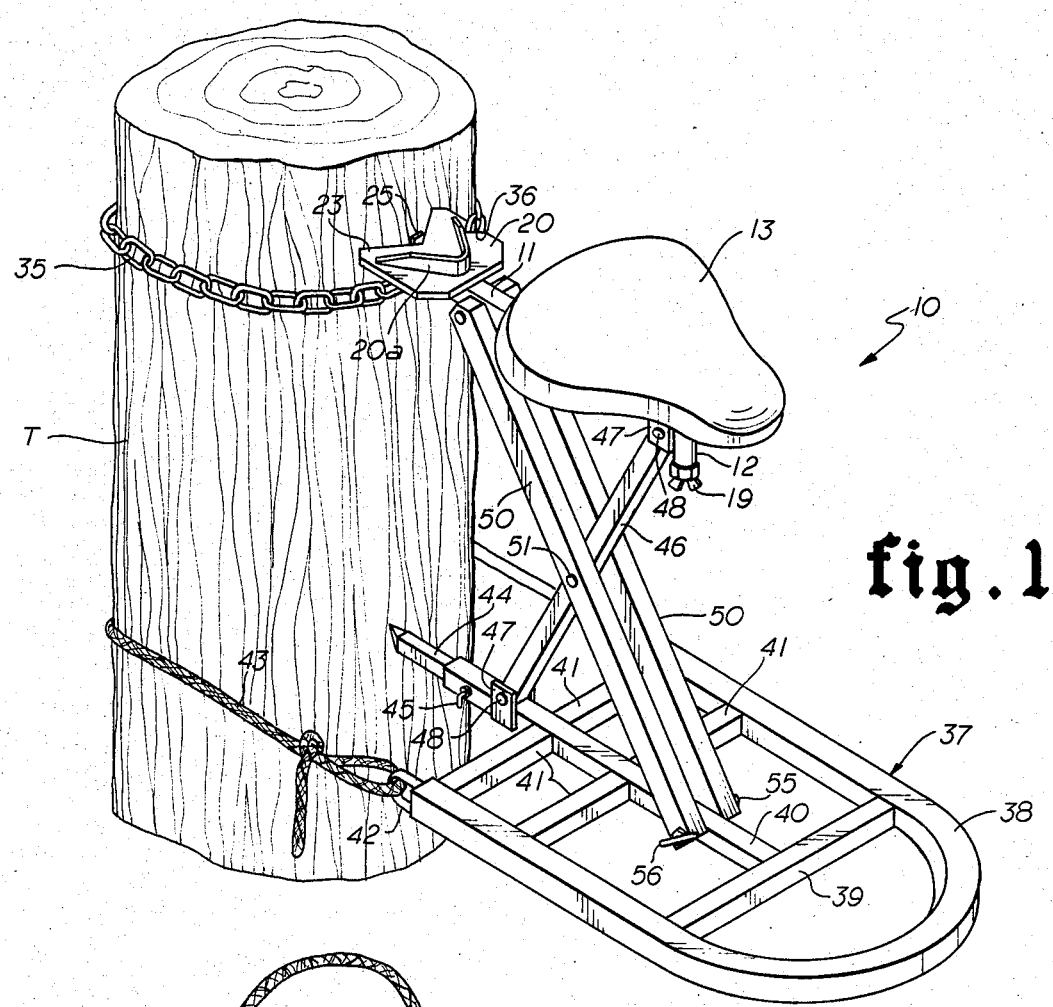
FIG. 1 is an isometric view of the portable hunting stand, illustrating a preferred embodiment of the invention, erected and mounted on a tree trunk.
Figure 2:
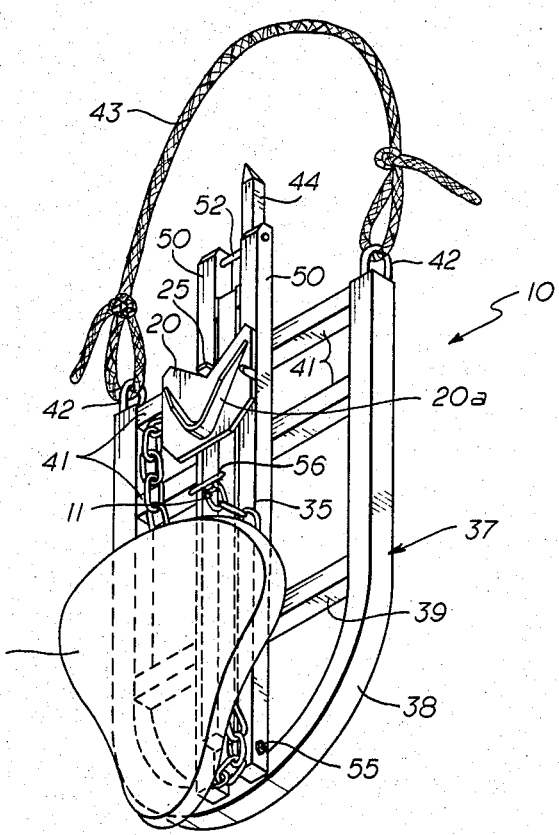
FIG. 2 is an isometric view of the portable hunting stand, shown in FIG. 1, in a folded transporting position.

Referring to the drawings by numerals of reference, there is shown a portable hunting stand 10. The stand 10 has a seat-supporting portion having an elongated horizontal seat support member 11 of square tubing, a hollow cylindrical seat housing sleeve 12 secured at a right angle at one end thereof, and rotatably receiving a padded seat 13. Bushings 14 contained in each end of the housing sleeve 12 reduce friction on rotation of the seat 13.

The seat 13 comprises a base 15 and a depending shaft 16 secured thereon and extending at a right angle thereto which is received through the bushings 14 within the sleeve 12. A circular stop washer 17 is secured to the top portion of the shaft 16 beneath the base 15 to rest on the top surface of the sleeve 12. The bottom portion of shaft 16 extends outwardly from the bottom of sleeve 12 and has threads 18 on which a wing nut 19 is received to secure the shaft 16 for adjustment and rotation.

A flat plate 20 is secured to the top surface of the horizontal support member 11 at the end opposite the seat pivot sleeve 12. Plate 20 has straight side edges 21 and 22 and a rear edge in the shape of a wide angle V-notch 23. A flat rectangular bar is bent into a wide angle V-shaped gusset 20a and welded to the flat plate 20 to strengthen the same against bending. A vertical slot 24 extends upwardly from the bottom surface of the support member 11. An L-shaped lock pin 25 has a vertical leg portion 26 extending upwardly to contact the crotch of the V-notch 23, and a horizontal leg portion 27 slidably received in the open end of the horizontal support member 11.

The horizontal leg 27 of lock pin 25 has a longitudinal slot 28 and covers the open bottom of the vertical slot 24 to capture a pivot pin 52 within the slot 24 (described below). Vertically aligned holes 29 and 30 extend through the plate 20 and the top surface of the support member 11 respectively. A vertically aligned threaded hole 31 extends through the bottom surface of support member 11 to receive a bolt 32 (FIG. 4).

A compression spring 33 surrounds the bolt 32 within the open end of the support member 11 and biases the the horizontal leg 27 of the lock pin 25 against the inner bottom surface of the support member 11. In this manner, the vertical slot 24 remains closed off by the lock pin 25, but the lock pin may be pulled outwardly to open the slot 24 and release the pivot pin when the platform is to be folded (as explained hereinafter). A vertical hole 34 in the support member 11 inwardly of the plate 20 is used in securing the stand in the folded position.

The rear edge of the plate 20 has a wide angle V-notch 23 to engage the circumference of a pole or tree trunk T and the rear corner portions are angled to eliminate sharp projections. One end of a length of link chain 35 is welded to one side 21 of the plate 20 and the opposed, free end of the chain has selected links selectively received within a slot 36 extending diagonally inward from the other side 22 of the plate 20. Chain 35 is arranged to form a loop extending about the tree trunk T. The size of the loop may be readily adjusted to conform to the diameter of the tree trunk by engaging the appropriate link in the slot 36.

A U-shaped foot platform 37 is provided to support the horizontal seat support member 11. The platfrom 37 comprises an outer U-shaped member 38 of square tubing with a cross member 39 of square tubing welded transversely between the parallel leg portions thereof near the curved portion of the "U". A central member 40 of square tubing has one end welded to cross member 39 and extends between the parallel leg portions of the "U" in substantially parallel relation thereto.

The outer end of the central member 40 terminates beyond the ends of the leg portions of the U-shaped member 38. A series of shorter cross members or braces 41 are welded transversely between the central cross member 40 and the leg portion of the U-shaped member 38. A loop or ring 42 is secured in the end of each leg portion of the U-shaped member 38 to receive a rope 43 to assist in securing the platform in place.

A spike 44, of square cross-section, is slidably received within the extended end of the central member 40, and releasably locked in a selected position therein by an L-shaped lock screw 45. The extended end of the spike 44 has a sharp edge or point at its outer end to engage the surface of the tree trunk T.

A center leg member or brace 46 extends diagonally between the horizontal support member 11 and the central horizontal member 40 from a point near the pivot sleeve 12 to a point near the outer end of the central member 40. Each end of the central brace 46 is pivotally mounted within a pair of extended mounting ears 47 by pivot pins 48. A hole 49 extends vertically through the center leg 46 for securing the hunting stand in the folded position.

A pair of parallel laterally spaced outer legs or braces 50 extend diagonally between a point on the horizontal support member 11 near the plate 20 to a point on the central horizontal member 40 near the inward end thereof. The outer braces 50 extend diagonally in opposed relation to the central leg 40 and are pivotally connected thereto by pivot pin 51. The outer braces 50 are pivotally connected at their upper ends by a pivot pin 52.

Figure 6:
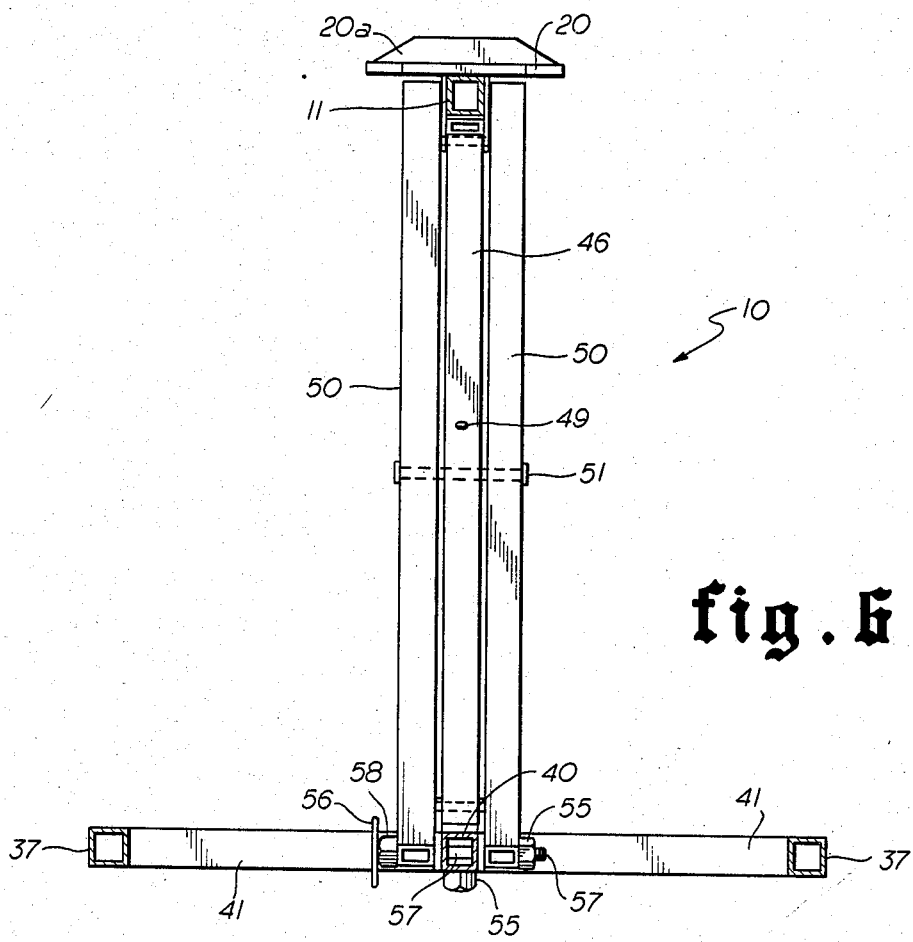
FIG. 6 is a vertical cross section of the portable hunting stand in the erected position taken on line 6—6 of FIG. 2.
Figure 7:
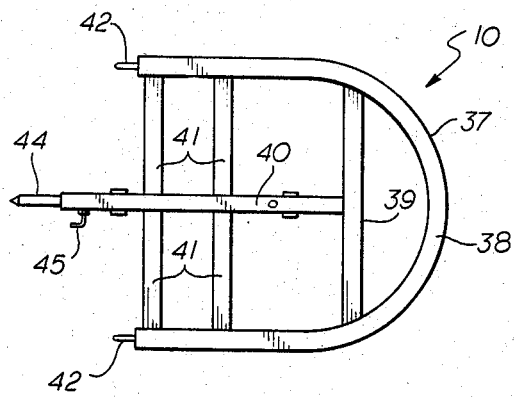
FIG. 7 is a bottom plan view of the platform of the hunting stand with certain parts omitted for clarity.
Figure 8:
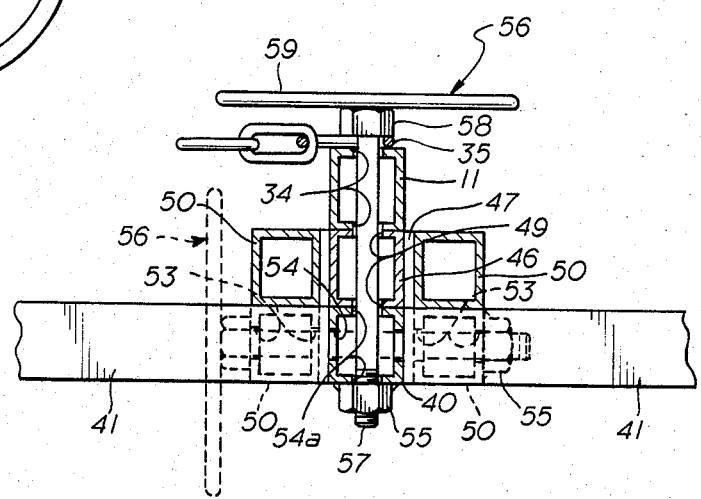
FIG. 8 is an enlarged cross sectional view showing the details of the T-bolt securing the braces of the hunting stand.

A hole 53 (FIG. 8) extends horizontally through the lower ends of the outer legs 50 aligned with a hole 54 in the central member 40. A threaded nut 55 is welded to the outer surface of one of the outer braces 50 in alignment with the holes 53 and 54, and a second nut 55 is welded to the bottom surface of the central member 40 in alignment with vertical holes 54a extending therethrough. A T-bolt 56 comprising a threaded shaft 57 having a bolt head 58 and a short transverse bar or rod 59 extending outwardly therefrom is removably received through the holes 53 and 54 and into the nut 55 to secure the outer legs 50 releasably to the central member 40. FIG. 6 shows the braces secured by the T-bolt in the erected position, and FIG. 8 shows the braces secured in the folded position.

OPERATION

The portable hunting stand 10 is erected and attached to a pole or tree trunk by removing the T-bolt 56 and unwrapping the chain 35 from the stored position. The seat support member 11 is lifted from the U-shaped platform 37 extending the legs 46 and 50. The pivot pin 52 of the outer braces 50 is inserted into the slot 24 and the lock pin 25 is pushed inwardly into the open end of the support member 11 until it bottoms in the crotch of the V-notch 23, securely locking the pivot pin 52 into the slot 24 of support member 11. The T-bolt 56 is then inserted through the holes 53 and 54 into the nut 55 and tightened to lock the legs 50 securely to the central horizontal member 40 of the platform 37. In this manner, the stand 10 is secured in the erected position. The stand is then lifted to the desired height on the pole or tree trunk.

The chain 35 is wrapped around the circumference of the tree trunk, and one link is inserted into the slot 36. The chain may locked together by padlock (combination or key operated) for further security. The spike 44 is extended the proper length from the platform 37 to maintain the proper seating angle relative to the ground and compensate for irregular curves in the mounting surface, and the L-shaped lock screw 45 is tightened. The spike 44 is firmly implanted into the supporting pole or tree trunk. The rope 43 attached to the rings 42 on the leg portions of the U-shaped platform may then be loosened from one ring, wrapped around the circumference of the pole or tree trunk, and then tied back on the ring as a secondary safety securing means and to increase the stability of the stand.

The shaft 16 of the seat 13 is offset from the center of the seat to permit the occupant to rotate the seat away from the pole or tree trunk to provide full freedom of arm movement with feet stayed on the platform. The user may also rotate the seat toward the pole or tree trunk to provide more standing room on the platform. The U-shaped platform, having no sharp corners, is safe from gear or clothing from becoming caught when mounting and allows safe and easy access when approaching from below. The lock pin position is always visible to the occupant to assure that the braces do not accidentally become disconnected from the support member.

To remove, fold, and transport the stand 10, rope 43 is untied. The U-shaped platform 37 is pushed up to loosen the chain 35 which is then removed from the slot 36. The stand can then be lowered to the ground. The T-bolt 56 is removed. The lock pin 25 is pulled outwardly from the support member to open the vertical slot 24, and the support member 11 is lifted up to release the outer brace pivot pin 52 from the slot. Braces 46 and 50 and support member 11 are then folded down onto the U-shaped platform 37.

The chain 35 is wrapped around the plate 20 and the seat pivot collar 72. A selected link in the loose end of the chain 35 is placed over the hole 34 in the support member 11. The T-bolt 56 is then inserted through the chain link and the vertical holes in the support member, center leg, and central cross member of the U-shaped platform and tightened to lock the stand in the folded position with the chain secured thereto (FIG. 8). The loose end of the rope may then be tied back on the ring to serve as a shoulder sling for quietly transporting the stand and leaving the hands free for carrying hunting gear or climbing, etc.

While this invention has been described fully and completely with special emphasis upon a single preferred embodiment, it should be understood that within the scope of the appended claims the invention may be practiced otherwise than as specifically described herein.

I claim:
1. A portable hunting stand foldable from a collapsed transporting position to an erected position attachable to a vertically extending object comprising;
 a rigid platform member,
 an seat support member movably connected to said platform member and releasably secured in a position substantially parallel thereto in an erected position,
 one end of said seat support member being operable to abut the side of said vertically extending object for attachment thereto,
 a seat member rotatably mounted on said support member,
 a center brace member hinged to said seat support member and hinged to said platform member,
 a pair of parallel brace members spaced one on each side of said center brace member and pivotally connected thereto,
 said parallel brace members being releasably secured at one end to said seat support member and at the other end to said platform member,
 said center brace member being movable to a position paralleling said platform,
 said pair of parallel brace members being movable to a position straddling said center brace member and parallel thereto,
 said seat support means being movable to a position paralleling said center brace member when said stand is in the collapsed transporting position,
 attaching means on said seat support member adapted to be looped around said vertically extending member and releasably and adjustably secured by its other end to said seat support member for attaching said stand to said vertically extending object, and
 locking means on said platform for releasably securing said platform, said brace members, and said seat support member in an extended or retracted position.

2. A portable hunting stand foldable from a collapsed transporting position to an erected position attachable to a vertically extending object comprising;
 a rigid platform member adapted to be positioned in a substantially horizontal engaged relationship with the side of said vertically extending object,
 an elongated rigid seat support member adapted to be movably connected with said platform member and releasably secured thereabove and substantially parallel thereto when said stand is in an erected position, one end of said seat support member abutting the side of said vertically extending object when said hunting stand is attached thereto,
 a seat member rotatably mounted on said seat support member at the end of said seat support means opposite the abutting end,
 a center brace member hinged at one end to said seat support member and extending angularly downwardly therefrom and hinged at its other end to said platform member in the erected position,
 a pair of parallel brace members spaced one to each side of said center brace member and pivotally connected thereto,
 said parallel brace members being releasably secured at one end to said seat support member and extending angularly downwardly therefrom in opposed relationship to said center brace member and releasably secured at their other end to said platform member in the erected position, said center brace member being movable to a position paralleling said platform immediately thereabove, said pair of parallel brace members movable to a position saddling said center brace member parallel thereto, and said seat support means movable to a position paralleling said center brace member immediately thereabove when said stand is in the collapsed transporting position, elongated attaching means secured at one end to said seat support member adapted to be looped around said vertically extending member and releasably and adjustably secured by the other end to said seat support member for attaching said stand to said vertically extending object, and locking means carried on said platform for releasably securing said platform, said brace members, and said seat support member in said extended and retracted positions.

3. A hunting stand according to claim 2 including a second elongated attaching and transporting means adapted to be looped around said vertically extending object and removably secured at each end to said platform to prevent disengagement thereof and increase stability of said stand in the erected position, said second attaching and transporting means being adapted to serve as a shoulder sling for carrying said stand in the collapsed transporting position.

4. A hunting stand according to claim 2 including a spike member adjustably mounted on said platform means and selectively extensible and retractable relative thereto to be at least partially embedded in the side of said vertically extending object for engaging said platform therewith and adjusting the horizontal position of said seat member relative to the ground in the erected position, said spike retractable inwardly relative to said platform in the collapsed transporting position, and locking means on said platform for securing said spike in said extended and retracted positions.

5. A hunting stand according to claim 2 in which said elongated attaching means comprises a selected length of link chain.

6. A hunting stand according to claim 5 including a flat horizontal plate member secured to said seat support member having edges extending longitudinally and laterally therefrom, said longitudinally extending edge being in the shape of a wide angle V-notch extending inwardly and transversely between said lateral edges, said chain being secured at one end to one of said lateral edges, the other said lateral edge having a slot extending laterally angularly inward therefrom toward said notch, said slot being of a size so as to receive a single link therein and preclude the passage therethrough of links angularly related to said single link.

7. A hunting stand according to claim 2 in which said second elongated attaching and transporting means comprises a length of rope, and said platform including means for receiving said rope.

8. A hunting stand according to claim 2 in which said rigid platform member being of substantially U-shaped configuration, the curved portion of which is positioned outward relative to the vertically extending object when said platform is in engaged relationship with the side of said object.

9. A stand according to claim 8 in which said platform comprises:

an outer U-shaped tubular member having a cross member extending transversely between the opposed parallel leg portions thereof near the curved portion, a central horizontal member having one end secured to said cross member and extending longitudinally outward therefrom between the opposed parallel leg portions, the extended end terminating beyond the ends of the parallel leg portions of said U-shaped member, and a series of shorter parallel spaced cross members extending transversely between said central cross member and the parallel leg portions of said U-shaped member.

10. A stand according to claim 2 in which said seat support member comprises:

an elongated tubular member having a hollow cylindrical sleeve secured vertically at one end rotatably receiving said seat member, bushings in each end of said sleeve, and said said seat member comprises:

a base extending longitudinally substantially the length of said seat, a shaft secured near one end of said base and depending therefrom, the depending end being threaded, said shaft being received through said bushings within said sleeve and extending outwardly below said sleeve, vertical stop means secured to the top portion of said shaft beneath said base and resting on the top surface of said cylindrical sleeve, and adjustable securing means threadedly received on said depending end of said shaft to rest on the bottom surface of said sleeve.

11. A stand according to claim 2 in which said pair of parallel brace members and said center brace member comprise elongated rigid tubular members, a first pivot pin pivotally connecting said brace members at a point intermediate their ends, a second pivot pin pivotally joining said brace members at their top ends in a laterally spaced relation, said seat support member having a slot in one end receiving said second pivot pin releasably when said stand is in the erected position, a sliding lock member selectively opening and closing the bottom of said slot to retain said second pivot pin therein, and a threaded lock bolt secured transversely through said platform member and said parallel brace members releasably securing the same to said platform member in the erected position, said lock bolt being removable from said transverse position and insertable vertically through said seat support member, said brace members, and said platform to releasably secure the same together in the collapsed transporting position.

* * * * *